US008510308B1

(12) United States Patent
Pasca et al.

(10) Patent No.: US 8,510,308 B1
(45) Date of Patent: Aug. 13, 2013

(54) EXTRACTING SEMANTIC CLASSES AND INSTANCES FROM TEXT

(75) Inventors: Marius Pasca, New York, NY (US); Benjamin Van Durme, Rochester, NY (US)

(73) Assignee: Google Inc., Mountain View, CA (US)

( * ) Notice: Subject to any disclaimer, the term of this patent is extended or adjusted under 35 U.S.C. 154(b) by 127 days.

(21) Appl. No.: 12/816,852

(22) Filed: Jun. 16, 2010

Related U.S. Application Data

(60) Provisional application No. 61/187,524, filed on Jun. 16, 2009.

(51) Int. Cl.
*G06F 7/00* (2006.01)
*G06F 17/30* (2006.01)

(52) U.S. Cl.
USPC .......................................................... 707/740

(58) Field of Classification Search
None
See application file for complete search history.

(56) References Cited

U.S. PATENT DOCUMENTS

| 4,839,853 | A * | 6/1989 | Deerwester et al. .................. 1/1 |
| 2004/0139067 | A1 * | 7/2004 | Houle ................................ 707/3 |
| 2005/0108001 | A1 * | 5/2005 | Aarskog ......................... 704/10 |
| 2006/0230033 | A1 * | 10/2006 | Halevy et al. ...................... 707/3 |
| 2008/0114756 | A1 * | 5/2008 | Konig et al. ....................... 707/5 |
| 2012/0179682 | A1 * | 7/2012 | De Saeger et al. ............ 707/737 |

OTHER PUBLICATIONS

Lau et al, Towards Context-Sensitive Domain Ontology Extraction 2007, QUT Digital Repository, Proceedings 40th Hawaii International Conference on System Sciences, pp. 1-10.*
Lankhorst et al, Automatic Word Categorization: An Information-theretic Approach 1992, Groningen, pp. 1-13.*
Template | Define Template at Dictionary.com [Accessed: Aug. 5, 2012], reference.com, http://dictionary.reference.com/browse/template.*
Anbalagan et al, Automated Inference of Pointcuts in Aspect-Oriented Refactoring May 20-26, 2007, ICSE 2007 29th International, 127-136.*
Dekang Lin et al., "Concept Discovery from Text", Department of Computing Science, University of Alberta, Proceedings of the 19th International Conference on Computational Linguistics, 2002, 7 pages.
Martin A. Hearst et al., "Automatic Acquisition of Hyponyms from Large Text Corpora", Computer Science Division, University of California, Berkeley, 15th International Conference on Computational Linguistics, Aug. 23-28, 1992, Nantes, France, pp. 539-545.

(Continued)

*Primary Examiner* — Jason Liao
(74) *Attorney, Agent, or Firm* — Fish & Richardson P.C.

(57) ABSTRACT

Methods, systems, and apparatus, including computer programs encoded on a computer storage medium, for extracting semantic classes and corresponding instances from a collection of text. One aspect of the subject matter described in this specification can be embodied in methods that include the actions of receiving a collection of text; identifying an initial collection of instance-class pairs for the collection of text; clustering a collection of semantically similar phrases using the collection of text; generating, using one or more processors, an extracted collection of instance-class pairs using the initial collection of instance-class pairs and the semantically similar phrase clusters; and storing the extracted collection of instance-class pairs for use in information retrieval.

18 Claims, 4 Drawing Sheets

(56) References Cited

OTHER PUBLICATIONS

Patrick Pantel et al., "Automatically Labeling Semantic Classes", Information Science Institute, University of Southern California, Human Language Technology Conference of the North American Chapter of the Association for Computational Linguistics, May 2-7, 2004, 8 pages.

Brants, T., "TnT—A Statistical Part of Speech Tagger," Proceedings of the $6^{th}$ Conference on Applied Natural Language Processing (ANLP-00), pp. 224-231, 2000.

* cited by examiner

EXTRACTING SEMANTIC CLASSES AND INSTANCES FROM TEXT

CROSS-REFERENCE TO RELATED APPLICATIONS

This application claims the benefit under 35 U.S.C. §119(e) to U.S. Provisional Application Ser. No. 61/187,524, filed on Jun. 16, 2009, which is hereby incorporated by reference in its entirety.

BACKGROUND

This specification relates to extracting semantic classes and corresponding instances from a collection of text.

A conventional knowledge base is a type of database for use in the collection, organization, and retrieval of particular types of information. Knowledge base generation has increased with the availability of large collection of text (e.g., Web documents) and data sources (e.g., query logs). Conventional extraction processes for unstructured text have a particular class of knowledge (e.g., a category of information) manually specified in advance. Typically, a small set of manually selected instances representative of the class of interest are input to train an extraction process for the collection of text. This includes, for example, instances within the same class, attributes of the class, or relations which involve the class.

An instance in the text collection represents text (e.g., of Web documents) identified as being associated with the respective class. Instance-class relationships can be extracted using particular text patterns as templates. For example, each instance X and a class Y can follow the templates X is a Y or Y such as X, X', and/or X". For example, "a beagle is a dog" indicates that "beagle" is an instance of the class "dog". Similarly, "a dog such as a beagle, corgi, or keeshond" indicates that "beagle" "corgi" and "keeshond" are instances of the class "dog". The manual selection of classes typically results in a small number of course-grained classes, e.g., Location, Person, or Organization. The knowledge base is generated using the extracted content corresponding to the manually specified classes.

SUMMARY

This specification describes technologies relating to extracting semantic classes and corresponding instances from a collection of text.

In general, one aspect of the subject matter described in this specification can be embodied in methods that include the actions of receiving a collection of text; identifying an initial collection of instance-class pairs for the collection of text; clustering a collection of semantically similar phrases using the collection of text; generating, using one or more processors, an extracted collection of instance-class pairs using the initial collection of instance-class pairs and the semantically similar phrase clusters; and storing the extracted collection of instance-class pairs for use in information retrieval. Other embodiments of this aspect include corresponding systems, apparatus, and computer program products.

These and other embodiments can optionally include one or more of the following features. Generating the extracted collection of instance-class pairs further includes identifying a class of the initial collection of instance-class pairs that labels at least one instance in a cluster of the semantically similar phrase clusters; determining whether a threshold number of instances paired with the class are found within the cluster; determining whether a threshold number of clusters of the semantically similar phrase clusters includes at least one instance of the class; and when both the threshold number of instances and the threshold number of clusters are satisfied, identifying each instance in the cluster paired with the class as instances of the class. The threshold number of instances is a minimum number of instances paired with the class found within the cluster. The threshold number of clusters is a maximum number of clusters that includes an instance of the class.

Identifying an initial collection of instance-class pairs includes generating initial instance-class pairs including applying one or more template patterns to a collection of documents. Identifying an initial collection of instance-class pairs includes receiving previously generated instance-class pairs. Clustering a collection of semantically similar phrases includes receiving an input vocabulary of phrases; identifying matches for the vocabulary of phrases in a collection of documents; identifying a context associated with each identified match; generating a vector associated with each matching phrase having the corresponding context as an entry in the respective vector; and clustering phrases using the vectors. The method further includes receiving a query; identifying one or more terms in the query corresponding to a class; retrieving instances corresponding to the class; and processing documents identified as responsive to the query such that documents in which the retrieved instances occur relative to the remaining query terms are promoted in a search results ranking.

Particular embodiments of the subject matter described in this specification can be implemented so as to realize one or more of the following advantages. An initial collection of instance-class pairs can be filtered to generate an extracted collection of more accurate instance-class pairs. Information retrieval techniques can provide improved results for particular types of queries using instance-class pairs.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
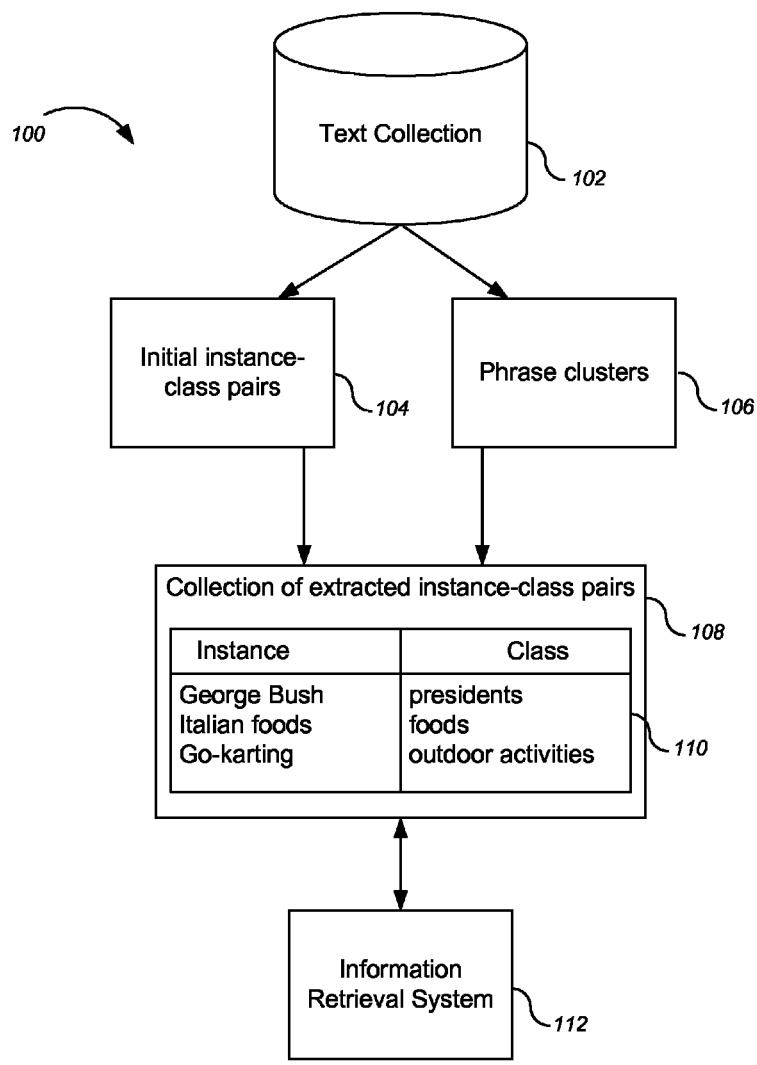
FIG. 1 is diagram of an example process flow for extracting and using instance-class pairs.

FIG. 1 is diagram 100 of an example process flow for extracting and using instance-class pairs. In particular, diagram 100 includes a text collection 102. The text collection 102 can represent one or more distinct collections of text, which can each include different textual sources, for example, Web documents and query logs. In some implementations, the text collection 102 is a Web repository including millions of English language Web documents. The text collection 102 is used to generate initial instance-class pairs 104 and phrase clusters 106. The instance-class pairs 104 and phrase clusters 106 are used to generate a collection of extracted class-instance pairs 108. Example extracted instance-class pairs 110 include instances and their corresponding classes, e.g., "george bush" as an instance corresponding to the class "presidents". In some implementations, a particular instance can belong to more than one class. Additionally, each class can include multiple instances such that there are several instance-class pairs having the same class but different instances.

The collection of class-instance pairs 108 can be used, for example, by an information retrieval system 112. For example, the information retrieval system 112 can use the collection of extracted instance-class pairs 108 to identify particular Web content in response to a received query.

Figure 2:
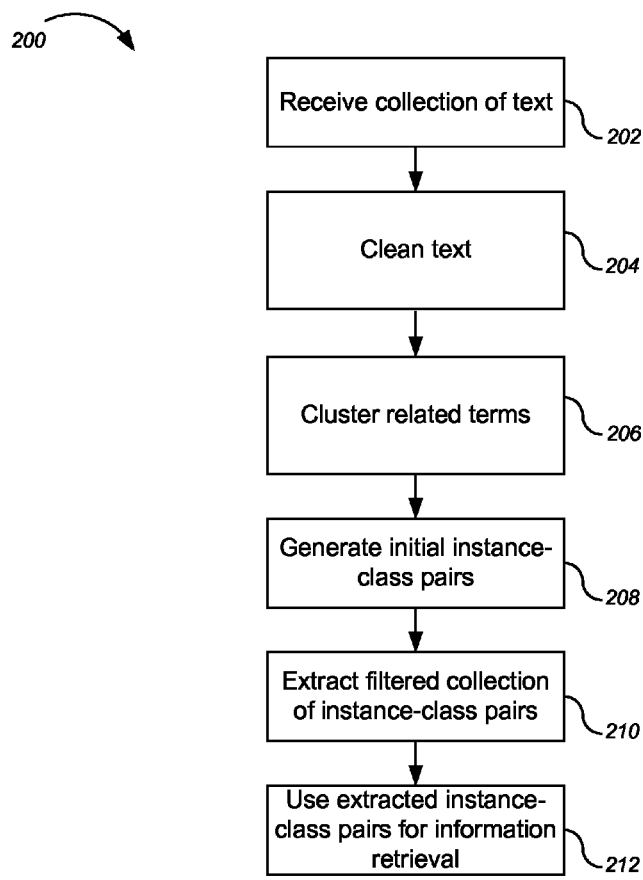
FIG. 2 is a flowchart showing an example method for extracting instance-class pairs.

FIG. 2 is a flowchart showing an example method 200 for generating extracted instance-class pairs. For convenience, the method 200 will be described with respect to a system (e.g., including one or more computing devices) that performs the method 200.

The system receives (202) a collection of text. For example, the system can receive a collection of Web documents from a Web repository. The system cleans (204) the received document text. In particular, the system can perform one or more of parsing out HTML tags, tokenizing the text, splitting the text into sentences, and tagging parts-of-speech. Parts of speech can be tagged using a statistical methods trained over a collection of text. For example, a parts of speech tagger using Markov models is described in Brants, T. "TnT—A Statistical Part of Speech Tagger," in *Proceedings of the 6th Conference on Applied Natural Language Processing* (ANLP-00), pp. 224-231, 2000. The part of speech tags can be used when searching for particular patterns (e.g., SuchAs-style patterns) as described in greater detail below. Specifically, parts of speech tags can be used to identify the boundaries of a category name or class label, for example "European countries" in the text fragment "in the name of European countries such as France".

The system generates clusters (206) of semantically related phrases, e.g., {george bush, bill clinton, . . . }. The clusters taken together form a partitioning of an instance vocabulary. The clusters can be built using distributional similarity. For example, the sentences "Clinton vetoed the bill" and "Bush vetoed the bill" suggest that Clinton and Bush may be semantically related. Thus, a cluster can be generated that includes both Clinton and Bush as semantically similar.

For example, an input vocabulary of phrases {P} can be collected. The system scans a set of document sentences to identify matches for each of those phrases. The system collects the context around each match between document text and the phrases. The context includes of a prefix and a postfix. In particular, the prefix and the postfix can be a specified number of words to the left and to the right of the match in the sentence. Each context becomes an entry in a vector associated with the phrase. The vector captures how the phrase appears in text, along with the associated frequencies of the phrases occurring. The system clusters the phrases based on their vectors to generate clusters of distributionally similar phrases. Additional details on clustering using distributional similarity can be found in Lin, D., and Pantel, P., "Concept discovery from text," in *Proceedings of the 19th International Conference on Computational Linguistics* (COLING-02), pp. 1-7, 2002.

The system generates (208) initial instance-class pairs, P. The initial instance-class pairs suggest mappings from instances, I, (e.g., george bush) to class labels, L, (e.g., president), where ⟨ I, L⟩ ∈P. L is considered a proposed label of instance I. In some implementation, the initial pairs are extracted using particular patterns. For example, templates of the patterns can be used to find text that matches the pattern, e.g., [X is a Y] and [Y such as X, X', and X"] where X is an instance and Y is a corresponding class.

For example, using "Y such as X" where Y is a class and X is an instance, if a sentence from a document reads, "the president decided to provide aid to important cities such as Birmingham," then the pair (Y=important cities, X=birmingham) would be extracted to form an initial instance-class pair. In another example, the sentence, "sales of little cars, such as the Tiny, are booming," results in the pair (Tiny, car). Additional details on initial instance-class pair extraction can be found in Hearst, M. "Automatic Acquisition of Hyponyms from Large Text Corpora," in *Proceedings of the 14th International Conference on Computational Linguistics* (COLING-92), pp. 539-545, 1992.

In some alternative implementations, the system receives the initial instance-class pairs, for example, from a previous generation process or from a remote location. Similarly, in some implementations, the system receives the clusters of similar phrases from a previous generation process or from a remote location. Additionally, in some other implementations, the initial instance-class pairs and clusters of similar phrases are generated using different collections of text.

The system uses the clusters and the initial instance-class pairs to extract (210) a filtered collection of instance-class pairs (e.g., from the initial instance-class pairs). The extracted instance-class pairs refine the associations between instances and classes identified in the initial instance-class pairs. Thus, the initial instance-class pairs can be a filtered to extract those initial instance-class pairs that satisfy the constraints. In particular, an empty set $P_{JK}$ is generated to which the resulting extracted instance-class pairs are added. Each semantic cluster S contained within the collection of clusters C is considered in turn. For each label L that labels at least one instance in S, the system verifies whether the number of such instances paired with L occur with at least J frequency within S. Constraint parameter J provides a label frequency constraint within a cluster. For example, if 37 instances in a cluster of 50 elements each had the label "president", then if 37/50>J, "president" would be a viable class label with respect to the intra-cluster restraint.

If a potential class label is viable based on the intra-cluster constraint, the system verifies whether the label satisfies an inter-cluster constraint, K. The group of all clusters having at least one instance in S, is referred to as the set $C_L$. If the number of clusters $C_L$ is less than the value of constraint K, the label is considered to be a good class label for pairing instances in S. Each instance in S that is paired with L is added to the extracted collection of instance-class pairs $P_{JK}$, assigning each of those instances to the class specified by the label.

For example, if there were five clusters that each had at least one element labeled "president" and the constraint K was greater than 5, then each of the instances in the cluster under consideration having been paired with the class label "president" would be recorded as true instances of the class (e.g., the instances would be used in extracted instance-class pairs).

The values assigned to the constraints J and K can be determined experimentally. In particular, as the value of J is decreased, the number of resultant classes increases. Similarly, the more distributed across clusters a label is allowed to be (according to the value of K), the larger the number of labels returned in the extracting process. Thus, the number of classes can be controlled to a degree based on the parameter values.

The extracting process for extracting a filtered collection of instance-class pairs from a initial instance-class pairs (extracted from text) can be written in pseudo-code, for example, as follows:

Given:
    I: set of instance phrases
    L: set of label phrases
    C: partitioning of I by distributional similarity
    $P \subset I \times L$: set of is-a phrase pairs Returns:
    $\overline{P} \subset P$ Parameters:
    $J \in [0,1]$: label frequency constraint (intra-cluster)
    $K \in N$: label frequency constraint (inter-cluster)

```
Let P_JK = { }
For each semantic cluster S ∈ C:
    For each class label L, where ∃I ∈ S such that <I,L> ∈ P:
        Let S_L = {I | I ∈ S, <I, L> ∈ P}
        Let C_L = {S' | S' ∈ C, ∃I ∈ S' : <I,L> ∈ P}
        If |S_L| > J × |S| :
            If |C_L| < K :
                Set P_JK = P_JK ∪ {<I, L> | I ∈ S, <I,L> ∈ P}
```

The instances and classes can be analogously compared to term frequency-inverse document frequency (TF-IDF) weighted values used in an information retrieval process. For example, the clusters provided as input to the extraction can be treated as documents. The class labels can be treated as document terms. A normalized "term frequency" is the number of instances in a cluster initially assigned a given label divided by the total number of instances in that cluster. Thus, the analogous "term frequency" score is constrained by the constraint J.

The inverse document frequency is typically given as the log of a total number of documents, first divided by the number of documents having the given term. The IDF value is based on the consideration that terms (labels) with wide distribution across documents (clusters) are less significant than those occurring more rarely. The constraint K can be used to limit the amount of spread of a class label. Specifically, the number of clusters covered (e.g., 1, 2, . . . , 30, . . . ) is used to directly regulate the spread of a class label rather than the log of the relative percentage.

The system optionally uses (212) the extracted instance-class pairs for information retrieval. In particular, the collection of instance-class pairs can be stored for use by, or as part of, an information retrieval system. In response to a received query, the system can use the instance-class pairs to identify or refine search results responsive to the query. In particular, use of the extracted instance-class pairs can be particularly useful for certain types of queries. For example, factual queries, "is a" relations, and list queries can use the extracted instance-class pair data for identifying resources responsive to the query. An example factual query can be "US president with five children". An "IsA" relation can be used to find a candidate set to refine a search, for example, "all instances of US president". Additionally, an example list query is "list of US presidents".

Figure 3:
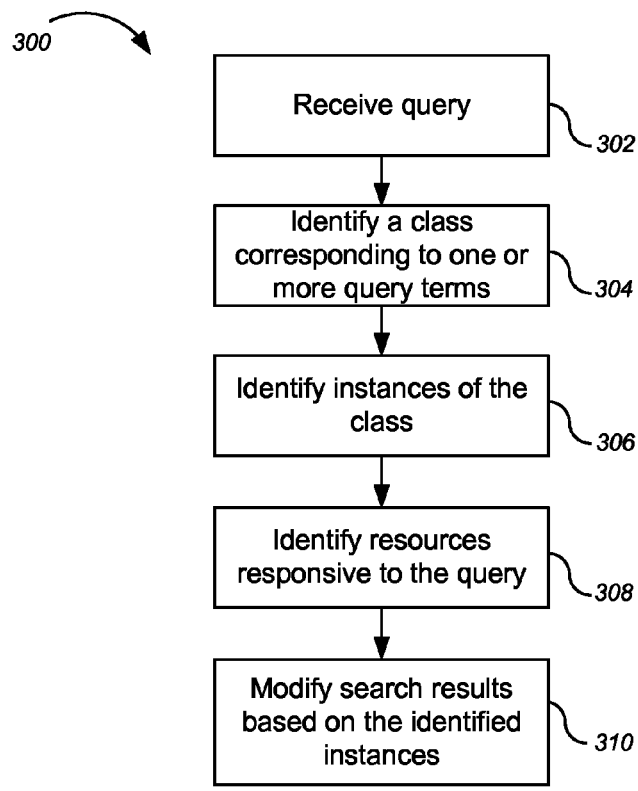
FIG. 3 is a flowchart showing an example method for using instance-class pairs in information retrieval.

FIG. 3 is a flowchart showing an example method 300 for using class-instance pairs in information retrieval. For convenience, the method 300 will be described with respect to a system (e.g., including one or more computing devices) that performs the method 300.

The system receives (302) a query. For example, the system can receive a search query at a search system from a client user. A user can submit a query to a search engine within a search system. When the user submits a query, the query is transmitted through a network from the client to the search system. Alternatively, the query can be received from a search system that is performing a search for resources responsive to the query. The search query includes one or more query terms. An example received query is: "what are the top us presidents".

The system identifies (304) a class corresponding to one or more query terms. In particular, the system searches a list of classes corresponding to the collection of instance-class pairs. Alternatively, the system directly searches the instance-class pairs in the collection of instance-class pairs. Thus, the system parses the query and searches for one or more matching classes that correspond to one or more query terms. For example, the system can identify the class "us presidents" according to the corresponding query terms.

The system identifies (306) instances of the class. In particular, the system identifies each instance-class pair in which an instance is paired to the identified class. In some implementations, the system identifies the instances from extracted instance class pairs generated as described above with respect to FIG. 2.

The system identifies (308) resources responsive to the query as search results. For example, the search system can include a search engine that can identify particular resources (e.g., documents, Web pages) that are responsive to the received query. The search system can be implemented as, for example, computer programs running on one or more computers in one or more locations that are coupled to each other through a network. In some implementations, the search system includes an index database and a search engine. The search system responds to the query by generating search results, which are transmitted through the network to the client device in a form that can be presented to the user (e.g., as a search results web page to be displayed in a web browser running on the client device).

Specifically, when the query is received by the search engine, the search engine identifies resources that match the query. The search engine will generally include an indexing engine that indexes resources (e.g., web pages, images, or news articles on the Internet) found in a corpus (e.g., a collection or repository of content), an index database that stores the index information, and a ranking engine (or other software) to rank the resources that match the query. The indexing and ranking of the resources can be performed using conventional techniques. The resulting identified resources are search results responsive to the query.

The system modifies (310) the search results based on the identified instances. In particular, the system can identify search results that are initially ranked according to particular criteria. The system can use the identified instances to modify the ranking of the identified resources. For example, when the resources identify search results in which an identified instance of the class occurs, the system can promote the ranking of that result. In some implementations, the system identifies instances that occur in the resources within a specified proximity of other terms in the query and promotes the corresponding search results. The search engine can transmit the modified search results through the network to the client device for presentation to the user.

Figure 4:
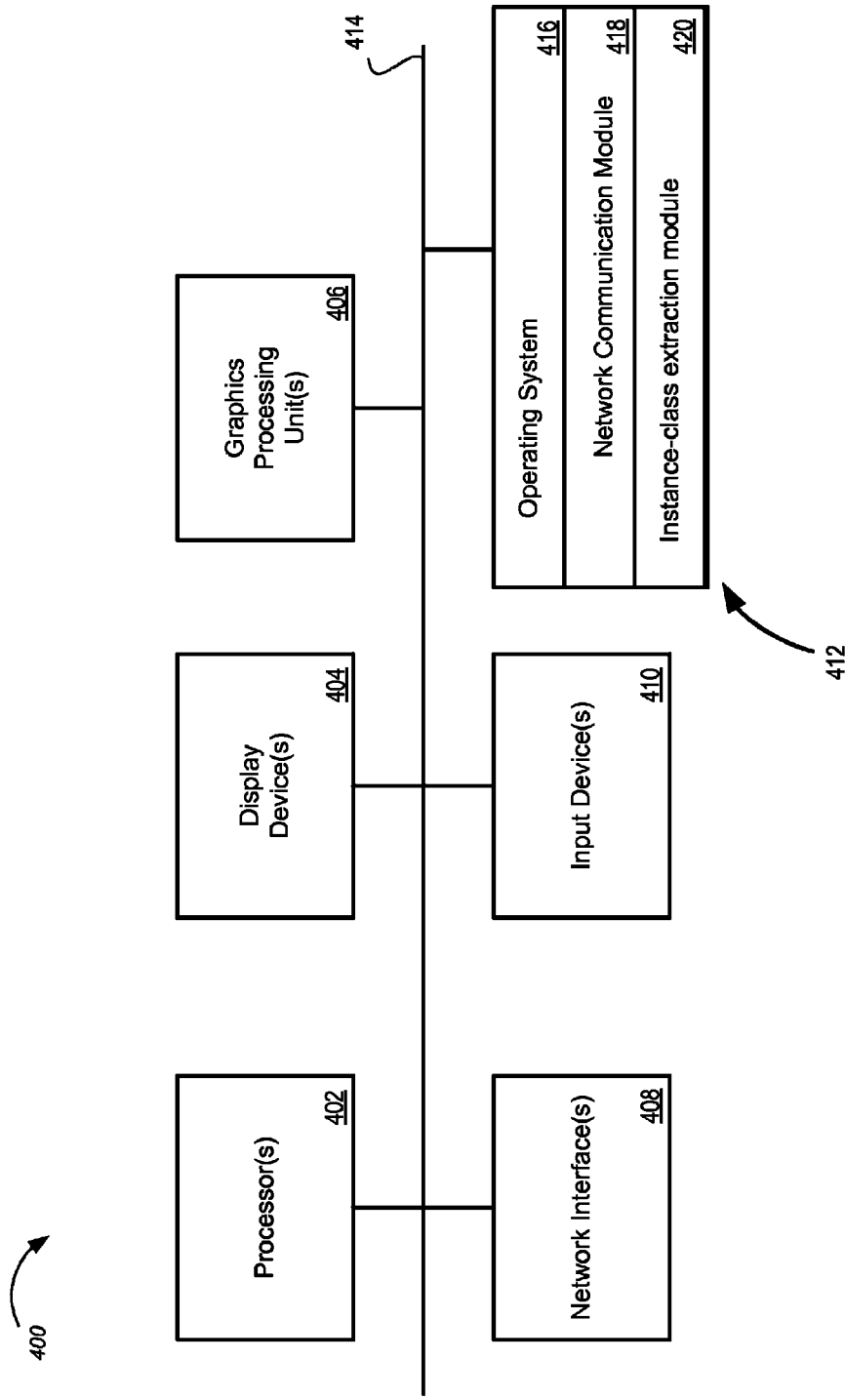
FIG. 4 illustrates an example system architecture.

FIG. 4 illustrates an example system architecture 400. The system architecture 400 is capable of performing operations for extracting and using instance-class pairs. The system architecture 400 includes one or more processors 402 (e.g., IBM PowerPC, Intel Pentium 4, etc.), one or more display devices 404 (e.g., CRT, LCD), graphics processing units 406

(e.g., NVIDIA GeForce, etc.), a network interface 408 (e.g., Ethernet, FireWire, USB, etc.), input devices 410 (e.g., keyboard, mouse, etc.), and one or more computer-readable mediums 412. These components exchange communications and data using one or more buses 414 (e.g., EISA, PCI, PCI Express, etc.).

The term "computer-readable medium" refers to any medium that participates in providing instructions to a processor 402 for execution. The computer-readable medium 412 further includes an operating system 416 (e.g., Mac OS®, Windows®, Linux, etc.), a network communication module 418, and instance-class extraction module 420.

The operating system 416 can be multi-user, multiprocessing, multitasking, multithreading, real-time and the like. The operating system 416 performs basic tasks, including but not limited to: recognizing input from input devices 410; sending output to display devices 404; keeping track of files and directories on computer-readable mediums 412 (e.g., memory or a storage device); controlling peripheral devices (e.g., disk drives, printers, etc.); and managing traffic on the one or more buses 414. The network communications module 418 includes various components for establishing and maintaining network connections (e.g., software for implementing communication protocols, such as TCP/IP, HTTP, Ethernet, etc.).

The instance-class extraction module 420 provides various software components for performing the various functions for extracting instance-class pairs and using instance-class pairs in information retrieval as described with respect to FIGS. 1-3.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method performed by data processing apparatus, the method comprising:
   receiving a collection of text;
   identifying a first collection of instance-class pairs for the collection of text, wherein the first collection of instance-class pairs are identified by applying one or more template patterns to a collection of documents;
   clustering a collection of semantically similar phrases using the collection of text;
   determining, for each class in the first collection of instance-class pairs:
      whether a threshold number of instances within a cluster in the semantically similar phrase clusters are labeled by the class, and
      whether a threshold number of clusters in the semantically similar phrase clusters include at least one instance that is labeled by the class;
   in response to determining that a threshold number of instances within a cluster are labeled by a class and a threshold number of clusters in the semantically similar phrase clusters include at least one instance that is labeled by the class, selecting each instance in the first collection of instance-class pairs that are labeled by the class to be included in a second collection of instance-class pairs; and
   storing the second collection of instance-class pairs for use in information retrieval.

2. The method of claim 1, where the threshold number of instances is a minimum number of instances paired with the class found within the cluster.

3. The method of claim 1, where the threshold number of clusters is a maximum number of clusters that includes an instance of the class.

4. The method of claim 1, where identifying a first collection of instance-class pairs comprises receiving previously generated instance-class pairs.

5. The method of claim 1, were clustering a collection of semantically similar phrases comprises:
   receiving an input vocabulary of phrases;
   identifying matches for the vocabulary of phrases in a collection of documents;
   identifying a context associated with each identified match;
   generating a vector associated with each matching phrase having the corresponding context as an entry in the respective vector; and
   clustering phrases using the vectors.

6. The method of claim 1, further comprising:
   receiving a query;
   identifying one or more terms in the query corresponding to a class;
   retrieving instances corresponding to the class; and processing documents identified as responsive to the query such that documents in which the retrieved instances occur relative to the remaining query terms are promoted in a search results ranking.

7. A computer-readable storage device storing instructions that, when executed by data processing apparatus, cause the data processing apparatus to perform operations comprising:
receiving a collection of text;
identifying a first collection of instance-class pairs for the collection of text, wherein the first collection of instance-class pairs are identified by applying one or more template patterns to a collection of documents;
clustering a collection of semantically similar phrases using the collection of text;
determining, for each class in the first collection of instance-class pairs:
whether a threshold number of instances within a cluster in the semantically similar phrase clusters are labeled by the class, and
whether a threshold number of clusters in the semantically similar phrase clusters include at least one instance that is labeled by the class;
in response to determining that a threshold number of instances within a cluster are labeled by a class and a threshold number of clusters in the semantically similar phrase clusters include at least one instance that is labeled by the class, selecting each instance in the first collection of instance-class pairs that are labeled by the class to be included in a second collection of instance-class pairs; and
storing the second collection of instance-class pairs for use in information retrieval.

8. The computer-readable storage device of claim 7, where the threshold number of instances is a minimum number of instances paired with the class found within the cluster.

9. The computer-readable storage device of claim 7, where the threshold number of clusters is a maximum number of clusters that includes an instance of the class.

10. The computer-readable storage device of claim 7, where identifying an first collection of instance-class pairs comprises receiving previously generated instance-class pairs.

11. The computer-readable storage device of claim 7, were clustering a collection of semantically similar phrases comprises:
receiving an input vocabulary of phrases;
identifying matches for the vocabulary of phrases in a collection of documents;
identifying a context associated with each identified match;
generating a vector associated with each matching phrase having the corresponding context as an entry in the respective vector; and
clustering phrases using the vectors.

12. The computer-readable storage device of claim 7, further comprising instructions that when executed by data processing apparatus cause the data processing apparatus to perform operations including:
receiving a query;
identifying one or more terms in the query corresponding to a class;
retrieving instances corresponding to the class; and
processing documents identified as responsive to the query such that documents in which the retrieved instances occur relative to the remaining query terms are promoted in a search results ranking.

13. A system comprising:
one or more processors configured to perform operations comprising:
receiving a collection of text;
identifying a first collection of instance-class pairs for the collection of text, wherein the first collection of instance-class pairs are identified by applying one or more template patterns to a collection of documents;
clustering a collection of semantically similar phrases using the collection of text;
determining, for each class in the first collection of instance-class pairs:
whether a threshold number of instances within a cluster in the semantically similar phrase clusters are labeled by the class, and
whether a threshold number of clusters in the semantically similar phrase clusters include at least one instance that is labeled by the class;
in response to determining that a threshold number of instances within a cluster are labeled by a class and a threshold number of clusters in the semantically similar phrase clusters include at least one instance that is labeled by the class, selecting each instance in the first collection of instance-class pairs that are labeled by the class to be included in a second collection of instance-class pairs; and
storing the second collection of instance-class pairs for use in information retrieval.

14. The system of claim 13, where the threshold number of instances is a minimum number of instances paired with the class found within the cluster.

15. The system of claim 13, where the threshold number of clusters is a maximum number of clusters that includes an instance of the class.

16. The system of claim 13, where identifying a first collection of instance-class pairs comprises receiving previously generated instance-class pairs.

17. The system of claim 13, were clustering a collection of semantically similar phrases comprises:
receiving an input vocabulary of phrases;
identifying matches for the vocabulary of phrases in a collection of documents;
identifying a context associated with each identified match;
generating a vector associated with each matching phrase having the corresponding context as an entry in the respective vector; and
clustering phrases using the vectors.

18. The system of claim 13, further configured to perform operations comprising:
receiving a query;
identifying one or more terms in the query corresponding to a class;
retrieving instances corresponding to the class; and
processing documents identified as responsive to the query such that documents in which the retrieved instances occur relative to the remaining query terms are promoted in a search results ranking.

* * * * *

UNITED STATES PATENT AND TRADEMARK OFFICE
CERTIFICATE OF CORRECTION

PATENT NO.       : 8,510,308 B1  
APPLICATION NO.  : 12/816852  
DATED            : August 13, 2013  
INVENTOR(S)      : Pasca et al.

Page 1 of 1

It is certified that error appears in the above-identified patent and that said Letters Patent is hereby corrected as shown below:

On the title page, item [56], column 2, line 5, delete "theretic" and insert -- theoretic --.

In the Claims

Claim 5, column 10, line 52, delete "were" and insert -- where --.

Claim 10, column 11, line 41, delete "an" and insert -- a --.

Claim 17, column 12, line 42, delete "were" and insert -- where --.

Signed and Sealed this
Eighth Day of April, 2014

Michelle K. Lee
*Deputy Director of the United States Patent and Trademark Office*